United States Patent
Wang et al.

(10) Patent No.: US 9,967,455 B2
(45) Date of Patent: May 8, 2018

(54) PORTABLE ELECTRONIC DEVICE WITH TOUCH SCREEN AND TOUCH OPERATION METHOD THEREOF

(71) Applicant: ASUSTeK COMPUTER INC., Taipei (TW)

(72) Inventors: Shih-Yang Wang, Taipei (TW); Hung-Chieh Lin, Taipei (TW); Chun-Chih Su, Taipei (TW)

(73) Assignee: ASUSTek COMPUTER INC., Taipei (TW)

( * ) Notice: Subject to any disclaimer, the term of this patent is extended or adjusted under 35 U.S.C. 154(b) by 0 days. days.

(21) Appl. No.: 14/740,274

(22) Filed: Jun. 16, 2015

(65) Prior Publication Data

US 2016/0191790 A1 Jun. 30, 2016

(30) Foreign Application Priority Data

Dec. 26, 2014 (CN) .......................... 2014 1 0826238

(51) Int. Cl.
| | |
|---|---|
| H04N 5/222 | (2006.01) |
| H04N 5/232 | (2006.01) |
| H04N 5/228 | (2006.01) |
| H04N 1/00 | (2006.01) |
| G06F 3/0488 | (2013.01) |

(52) U.S. Cl.
CPC ..... *H04N 5/23216* (2013.01); *H04N 5/23222* (2013.01); *H04N 5/23293* (2013.01); *G06F 3/0488* (2013.01); *H04N 1/00411* (2013.01)

(58) Field of Classification Search
CPC ........... H04N 1/00411; H04N 5/23293; H04N 5/23216; H04N 5/23222; G06F 3/0488

USPC ........................................ 348/333.01–333.02
See application file for complete search history.

(56) References Cited

U.S. PATENT DOCUMENTS

| | | | | |
|---|---|---|---|---|
| 8,578,286 | B2 * | 11/2013 | Noda ..................... | G03B 17/40 715/719 |
| 9,106,836 | B2 * | 8/2015 | Aoyama ........... | H04N 5/23293 |
| 9,596,405 | B2 * | 3/2017 | Huang ............... | H04N 5/23216 |
| 9,641,737 | B2 * | 5/2017 | Guo ....................... | H04N 5/232 |
| 2004/0008263 | A1 * | 1/2004 | Sayers ............... | H04N 5/23203 348/207.11 |

(Continued)

FOREIGN PATENT DOCUMENTS

| | | |
|---|---|---|
| CN | 102314309 | 1/2012 |
| CN | 103150096 | 6/2013 |

(Continued)

*Primary Examiner* — Ngoc-Yen Vu
(74) *Attorney, Agent, or Firm* — JCIPRNET (57) ABSTRACT

A portable electronic device and a touch operation method thereof are provided. When the portable electronic device is at an image capturing mode, a touch event on a touch screen is detected. Next, a shooting countdown time is determined according to a location of an end point of the touch event on a predetermined path. When no touch event is detected on the touch screen, executing the counting of the shooting countdown time, and an image capturing unit is triggered to capture an image when the counting of the shooting countdown time is up. The user directly enables a timed shooting function and sets a shooting countdown time at the same time by dragging a shutter button, which provides the convenience while operation.

15 Claims, 8 Drawing Sheets

(56) References Cited

U.S. PATENT DOCUMENTS

| | | | | |
|---|---|---|---|---|
| 2006/0072028 A1* | 4/2006 | Hong | .................. | H04N 5/23216 348/333.01 |
| 2008/0204402 A1* | 8/2008 | Hirata | ................... | G06F 3/0481 345/156 |
| 2010/0271533 A1* | 10/2010 | Bogusky | .............. | H04N 1/2112 348/335 |
| 2011/0035665 A1* | 2/2011 | Kim | ................... | G06F 3/04883 715/702 |
| 2012/0011456 A1 | 1/2012 | Noda et al. | | |
| 2014/0033100 A1 | 1/2014 | Noda et al. | | |

FOREIGN PATENT DOCUMENTS

| | | |
|---|---|---|
| CN | 104182313 | 12/2014 |
| EP | 2985991 | 2/2016 |

\* cited by examiner

PORTABLE ELECTRONIC DEVICE WITH TOUCH SCREEN AND TOUCH OPERATION METHOD THEREOF

CROSS-REFERENCE TO RELATED APPLICATION

This application claims the priority benefit of China application serial no. 201410826238.X, filed on Dec. 26, 2014. The entirety of the above-mentioned patent application is hereby incorporated by reference herein and made a part of this specification.

BACKGROUND OF THE INVENTION

Field of the Invention

The invention relates to an electronic device and, more particularly, to a portable electronic device and a touch operation method thereof.

Description of the Related Art

With the development of science technology, electronic products such as a smart phone, a tablet computer and a notebook computer, become necessary in daily life. The electronic product usually includes a touch screen to receive the operation and a command from the user. The touch screen further presents a visual feedback and the operating result after receiving the touch operation. Thus, the touch screen is a popular input and output device of an electronic product. Additionally, the electronic device usually includes a camera for shooting photos.

Conventionally, when the user shoots photos by the electronic product, the touch screen further shows a virtual shutter button and an image preview. When the virtual shutter button is triggered by a finger or a touch input unit, the electronic product is driven to shoot an image. However, when the user wants to take self-portraits via the front camera of the electronic product, the user needs to hold the electronic product by one hand and press the virtual shutter button by one finger at the same time, which results in unexpected images due to shaking or shifting of the electronic product.

BRIEF SUMMARY OF THE INVENTION

A portable electronic device and a touch operation method thereof are provided. The user directly triggers a timed shooting function and sets a shooting countdown time at the same time by dragging a shutter button, which improves the convenience of operating the portable electronic device.

A touch operation method applied to a portable electronic device which includes a touch screen and an image capturing unit. The touch operation method includes following steps: detecting a touch event on the touch screen when the portable electronic device is at an image capturing mode; determining a shooting countdown time according to a location of an end point of the touch event at a predetermined path, wherein a location of a start point of the touch event is in a shooting trigger area; and starting to count the shooting countdown time when no touch event is detected on the touch screen, and triggering the image capturing unit to shoot an image when the shooting countdown time is up.

A portable electronic device disclosed herein includes an image capturing unit, a touch screen, a storage unit and a processing unit. The image capturing unit shoots an image, and the touch screen detects a touch event. The processing unit is connected to the image capturing unit, the touch screen and the storage unit to access and execute a plurality of modules stored in the storage unit. The plurality of modules include a touch event receiving module, a shooting time determining module and a countdown and shooting module. The touch event receiving module detects the touch event on the touch screen at an image capturing mode. The shooting time determining module determines a shooting countdown time according to a location of an end point of the touch event at a predetermined path, and a location of a start point of the touch event is located at the shooting trigger area. When no touch event is detected on the touch screen, the countdown and shooting module starts to count the shooting countdown time, and triggers the image capturing unit to shoot the image when the shooting countdown time is up.

These and other features, aspects and advantages of the present invention will become better understood with regard to the following description, appended claims, and accompanying drawings.

DETAILED DESCRIPTION OF THE EMBODIMENTS

A portable electronic device with a touch screen detects a touch event at the touch screen at an image capturing mode, and a shooting trigger area at the touch screen is defined. When a start point of the touch event is located at the shooting trigger area, a shooting countdown time is determined according to a location of an end point of the touch event. When no touch event is detected on the touch screen, the portable electronic device shoots an image when the shooting countdown time is up. For more detail description, the portable electronic device is illustrated with embodiments in the following.

Figure 1:
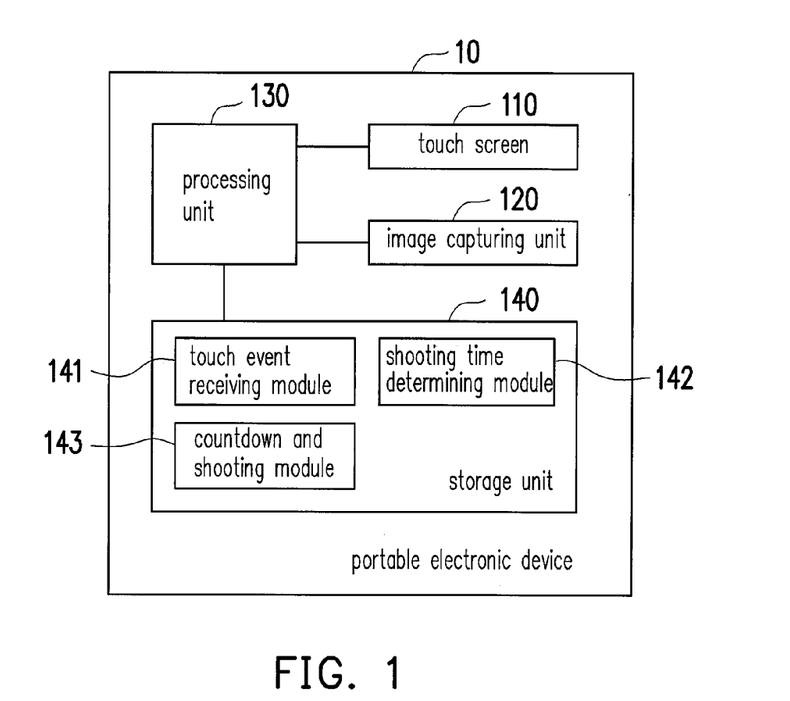
FIG. 1 is a block diagram showing a portable electronic device in an embodiment.

FIG. 1 is a block diagram showing a portable electronic device in an embodiment. Please refer to FIG. 1, the portable electronic device 10 includes a touch screen 110, an image capturing unit 120, a processing unit 130 and a storage unit 140. In the embodiment, the portable electronic device 10 is a mobile phone, a personal digital assistant, a smart phone, a tablet computer, an e-book, or a game machine, which is not limited herein.

The touch screen 110 is a display device with a touch detecting unit, and the touch screen 110 provides a display function and an input function. In an embodiment, the display device is a liquid crystal display (LCD), a light-emitting diode (LED) display, or a field emission display (FED), which is not limited herein. In an embodiment, the touch detecting unit detects a touch event from a finger, a palm or other objects at the touch screen 110. In an embodiment, the touch detecting unit is a capacitive touch detecting unit, a surface acoustic wave touch detecting unit, an electromagnetic touch detecting unit or a near field imaging touch detecting unit, which is not limited herein.

The image capturing unit 120 shoots an image, and the image capturing unit 120 includes a lens, an image sensor and an aperture. In an embodiment, the lens is one or a combination of a standard lens, a wide-angle lens or a zoom lens, which is not limited herein. In an embodiment, the image sensor is one or a combination of a charge coupled device (CCD) or a complementary metal-oxide semiconductor (CMOS), which is not limited herein.

In an embodiment, the storage unit 140 is one of or a combination of a random access memory (RAM), a read-only memory (ROM) or a flash memory or a hard disk, which is not limited herein. The storage unit 140 stores a plurality of modules executed by the processing unit 130. The plurality of modules are loaded by the processing unit 130 to execute a touch operation method.

The processing unit 130 is one of or a combination of a central processing unit (CPU), a programmable microprocessor, a digital signal processor (DSP), a programmable controller, an Application Specific Integrated Circuits (ASIC), a programmable logic device (PLD), which is not limited herein. The processing unit 130 is coupled to the touch screen 110, the image capturing unit 120 and the storage unit 140. The processing unit 130 accesses and executes the plurality of modules stored in the storage unit 140 to execute a touch operation method.

The portable electronic device 10 further includes a communication module (not shown in the figures), a power supply device (not shown in the figures), an audio output device (not shown in the figures) and a peripheral input device (not shown in the figures), which is not limited herein. The communication module is used for communication, and in an embodiment, the communication module includes an antenna for transmitting or receiving a radio frequency signal. In an embodiment, the power supply device includes a battery. The audio output device outputs an audio signal, and in an embodiment, the audio output device includes a loudspeaker. The peripheral input device receives an input signal, and in an embodiment, the peripheral input device includes a microphone disposed at the portable electronic device 10 or an external signal input device, which is not limited herein.

In the embodiment, the storage unit 140 includes a touch event receiving module 141, a shooting time determining module 142 and a countdown and shooting module 143. In an embodiment, the modules are computer programs or commands. The modules are loaded by the processing unit 130 to execute a touch event function. The steps of the touch event method executed by the portable electronic device 10 are illustrated in detail with embodiments in the following.

Figure 2:
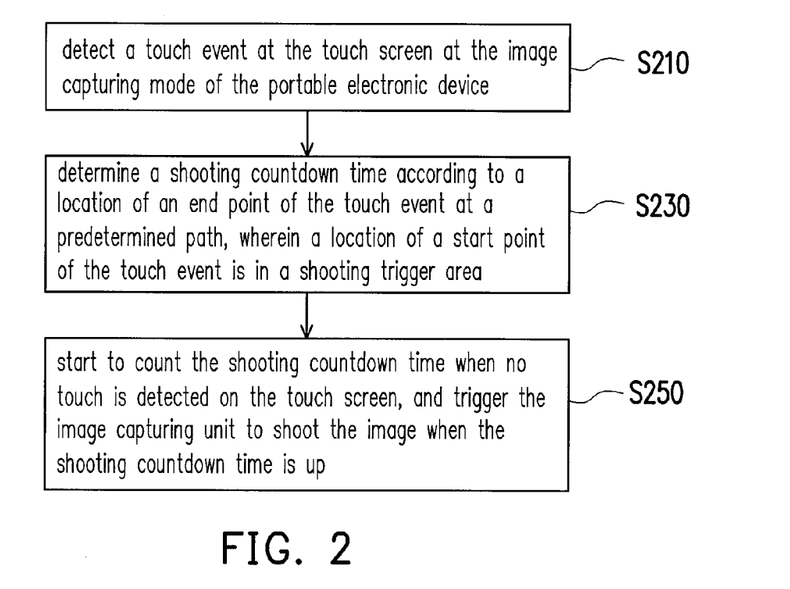
FIG. 2 is a flow chart showing a touch operation method in an embodiment.

FIG. 2 is a flow chart showing the touch event method in an embodiment. Please refer to FIG. 2, the method is applied to the portable electronic device 10 in FIG. 1. The steps of the touch event method are illustrated with the components of the portable electronic device 10.

When the portable electronic device 10 enters an image capturing mode, whether to trigger a timed shooting function is determined according to a touch and dragging operation. The portable electronic device 10 executes an application program with a shooting function to enter the image capturing mode, which is not limited. After the portable electronic device 10 enters the image capturing mode, the touch screen 110 displays a preview of the image obtained by the image capturing unit 120, and the user determines whether to control the portable electronic device 10 to shoot an image.

First, in the step S210, when the portable electronic device 10 is at the image capturing mode, the touch event receiving module 141 detects a touch event on the touch screen 110. In detail, when the touch event detecting unit of the touch screen 110 detects multiple touch points from the user, the touch event receiving module 141 determines the touch event at the touch screen 110 according to the touch points. Furthermore, the touch event receiving module 141 determines the kind of the touch event (such as a dragging operation, a click operation or a touch event) according to information (such as a moving track, a moving speed and a moving direction) of the touch event detected by the touch screen 110.

Then, in the step S230, the shooting time determining module 142 determines a shooting countdown time according to a location of an end point of the touch event at a predetermined path. A start point of the touch event locates in a shooting trigger area. That means, when the touch event receiving module 141 determines the start point of the touch event is located at the shooting trigger area, the shooting time determining module 142 determines the shooting countdown time according to the location of the end point of the touch event at the predetermined path, and the shooting countdown time is the countdown time for the timed shooting function. When the portable electronic device enables the timed shooting function, the portable electronic device starts to count down (which is 5 s in an embodiment) when the portable electronic device receives a shutter signal, and the shooting program is automatically executed after the counting is over.

A shutter icon is displayed in the shooting trigger area to notice the user that the portable electronic device 10 starts to shoot an image when the shooting trigger area is touched. The shape, the size and the location of the shooting trigger area is not limited, and the shooting trigger area can be adjusted according to requirements. The shooting trigger area covers the whole touch area of the touch screen 110 or covers a part of the touch area of the touch screen 110. The shooting trigger area can be at different locations of the touch screen 110. The predetermined path reminds users to touch and drag along the predetermined path. The predetermined path in an embodiment is a straight line, a spiral line, a circle, an arc or a Z-shaped path, and the length of the predetermined path is determined according to the size of the touch screen 110 and requirements of users, which is not limited herein.

Figure 3:
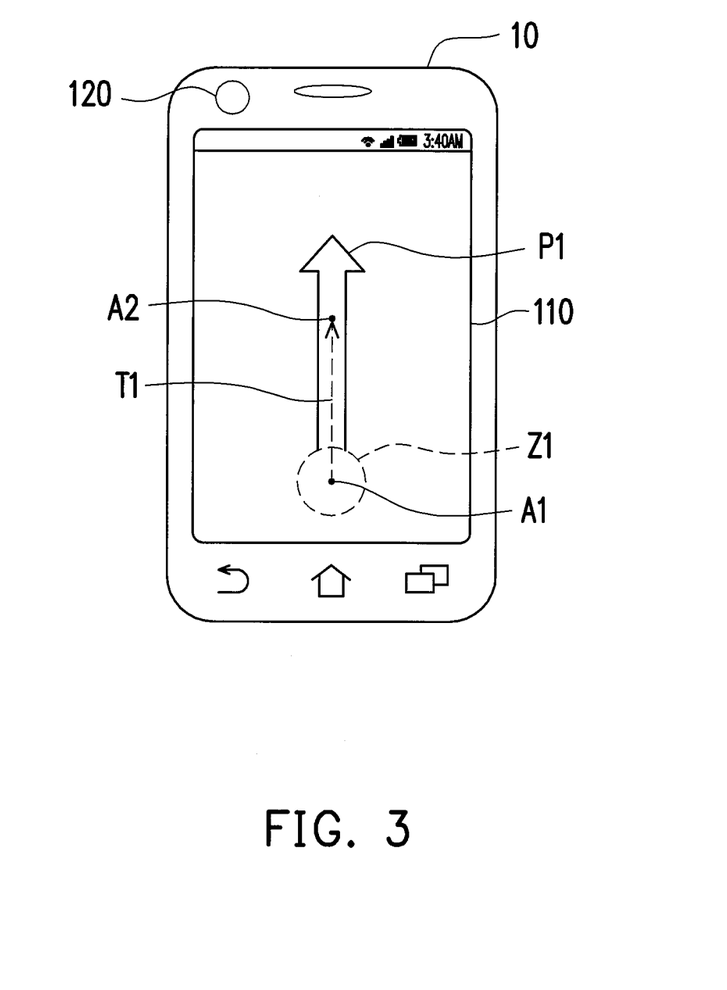
FIG. 3 is a schematic diagram showing a touch operation and a predetermined path in an embodiment.

In the embodiment, FIG. 3 is a schematic diagram showing the touch event and the predetermined path in an embodiment. Please refer to FIG. 3, the touch screen 110 includes a shooting trigger area Z1 and a predetermined path P1, and the predetermined path P1 extends upwards straightly from the shooting trigger area Z1. When the start point A1 of the touch event T1 is located at the shooting trigger area Z1, the shooting time determining module 142 determines the shooting countdown time according to the location of the end point A2 at the predetermined path P1. In the embodiment, when a distance between the end point A2 and the start point A1 becomes longer, the shooting countdown time is longer, which is not limited herein. In an embodiment, when a distance between the end point A2 and the start point A1 becomes longer, the shooting countdown time is shorter.

Back to the steps in FIG. 2, in the step S250, when the countdown and shooting module 143 detects no touch event is detected on the touch screen 110, the countdown and shooting module 143 starts to count the shooting countdown time and triggers the image capturing unit 120 to shoot the image when the shooting countdown time is up. That means, when the finger of the user or the touch input unit leaves the touch screen 110, the countdown and shooting module 143 starts the countdown process according to the shooting countdown time determined in the step S230 and triggers the image capturing unit 120 to shoot the image when the shooting countdown time is up.

In the embodiment, when the shooting countdown time determined according to the location of the end point is 5 s (which is not limited herein), the countdown and shooting module 143 starts the countdown to 5 s when no touch event is detected on the touch screen 110. When the countdown time is up, the countdown and shooting module 143 triggers the image capturing unit 120 to shoot the image. Thus, the timed shooting function can be quickly enabled, and the unexpected images due to the unstable holding while the touching of the shooting trigger area can be avoided.

In an embodiment, the portable electronic device determines the shooting countdown time according to the final sub section of the predetermined path where the dragging of the shutter icon stops. When the portable electronic device starts countdown, the state of the shutter icon reminds the user the countdown state and the shooting time point. It will be further illustrated in the following embodiment.

Figure 4:
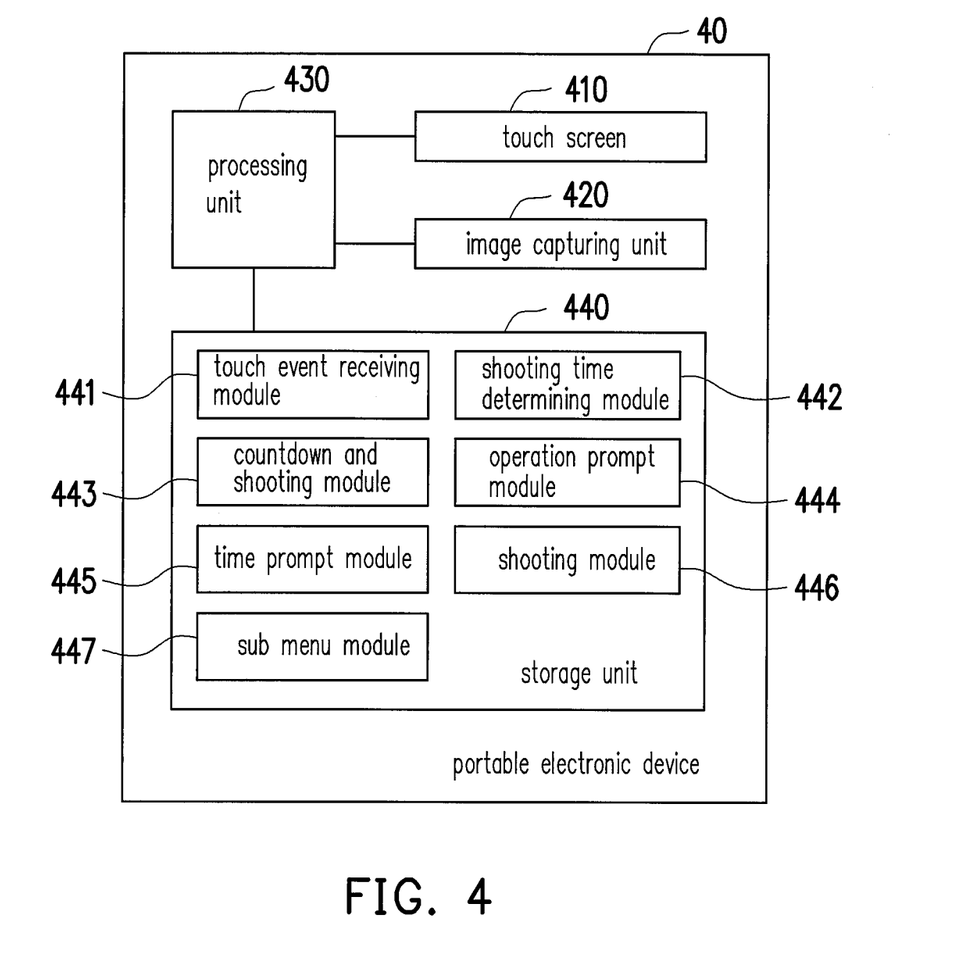
FIG. 4 is a block diagram showing a portable electronic device in an embodiment.

FIG. 4 is a block diagram showing a portable electronic device in an embodiment. Please refer to FIG. 1, the portable electronic device 40 includes a touch screen 410, an image capturing unit 420, a processing unit 430 and a storage unit 440. The touch screen 410, the image capturing unit 420, the processing unit 430 and the storage unit 440 are the same or similar with the touch screen 110, the image capturing unit 120, the processing unit 130 and the storage unit 140 in the previous embodiments, which is omitted herein.

The storage unit 440 includes a touch event receiving module 441, a shooting time determining module 442, a countdown and shooting module 443, an operation prompt module 444, a time prompt module 445, a shooting module 446 and a sub menu module 447. The touch event receiving module 441, the shooting time determining module 442 and the countdown and shooting module 443 are the same or similar with the touch event receiving module 141, the shooting time determining module 142 and the countdown and shooting module 143 in the previous embodiments.

Figure 5:
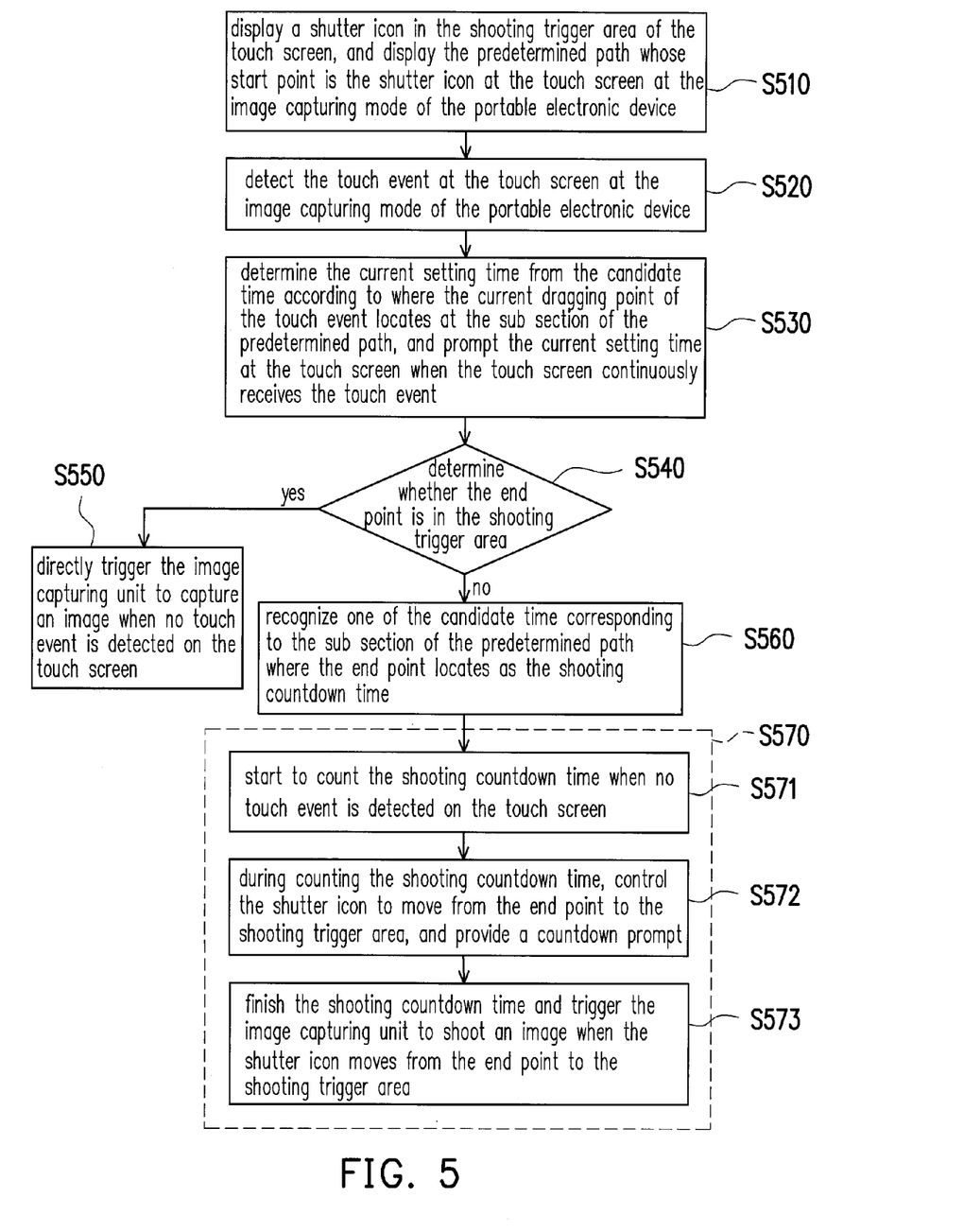
FIG. 5 is a flow chart showing a touch operation method in an embodiment.

In detail, FIG. 5 is a flow chart showing a touch event method in an embodiment. Please refer to FIG. 5, the method in the embodiment is adapted to the portable electronic device 40 in FIG. 4. The steps of the touch event method are described with the components of the portable electronic device 40 hereinafter.

First, in the step S510, at the image capturing mode of the portable electronic device 40, the operation prompt module 444 displays a shutter icon in the shooting trigger area of the touch screen 410, and the operation prompt module 444 displays the predetermined path whose start point is the shutter icon by the touch screen 410. The display location, the shape and the size of the predetermined path and the shutter icon are not limited. In the embodiment, the predetermined path is divided to at least one sub section. Different sub sections correspond to candidate time with different time lengths, respectively. That means, the predetermined path includes at least one sub section, and each of the sub sections of the predetermined path corresponds to the candidate time with a predetermined time length, respectively. Consequently, the corresponding candidate time is determined by determining the corresponding sub section at the predetermined path where the end point locates, and the candidate time is recognized as the shooting countdown time.

However, the dividing way and the number of the sub sections are not limited, and the lengths of the sub sections are the same or different. In the embodiment, when a distance between the sub section and the shooting trigger area at the predetermined path is longer, the corresponding candidate time is longer. Consequently, the user can set the shooting countdown time intuitively.

Figure 6A:
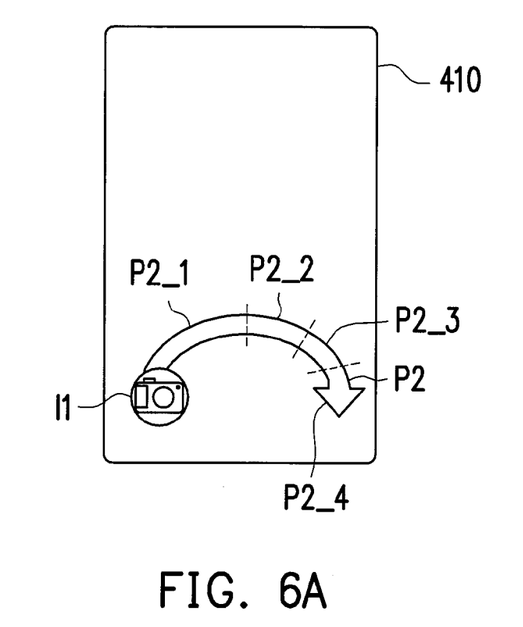
FIG. 6A and FIG. 6B are schematic diagrams showing sub sections of a predetermined path and a shutter icon in an embodiment.

In the embodiment, FIG. 6A is a schematic diagram showing the sub sections of the predetermined path and the shutter icon in an embodiment. Please refer to FIG. 6A, the operation prompt module 444 displays the shutter icon I1 and the predetermined path P2 by the touch screen 410. In the embodiment, the shutter icon I1 is located at the bottom left corner of the touch screen 410, and the predetermined path P2 is an arc path. The predetermined path P2 is divided to four sub sections which include the sub section P2_1, the sub section P2_2, the sub section P2_3 and the sub section P2_4. The sub section P2_1 corresponds to the candidate time of 2 s, the sub section P2_2 corresponds to the candidate time of 5 s, the sub section P2_3 corresponds to the candidate time of 10 s, and the sub section P2_4 corresponds to the candidate time of 15 s.

Figure 6B:
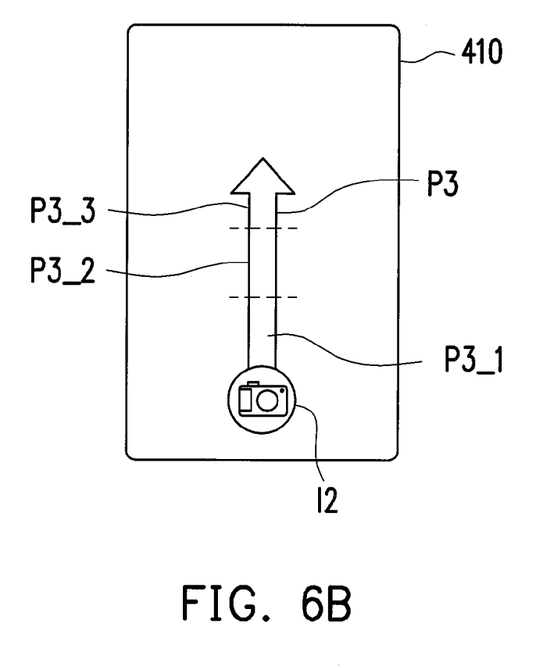

FIG. 6B is a schematic diagram showing the sub sections of the predetermined path and the shutter icon in an embodiment. Please refer to FIG. 6B, the operation prompt module 444 displays the shutter icon I2 and the predetermined path P3 by the touch screen 410. In the embodiment, the shutter icon I2 is located at the middle bottom area of the touch screen 410, and the predetermined path P3 is a straight line. The predetermined path P3 is divided to three sub sections which include the sub section P3_1, the sub section P3_2 and the sub section P3_3. The sub section P3_1 corresponds to the candidate time of 3 s, the sub section P3_2 corresponds to the candidate time of 8 s, and the sub section P3_3 corresponds to the candidate time of 12 s.

Please refer to the step S520 in FIG. 5, at the image capturing mode of the portable electronic device 40, the touch event receiving module 441 detects the touch event on the touch screen 410. The start point of the touch event is located at the shutter icon, which means the start point of the touch event is located at the shooting trigger area. In the step S530, when the touch screen 410 continuously receives the touch event, the time prompt module 445 determines the current setting time from the candidate time according to where the current dragging point of the touch event locates at the sub section of the predetermined path, and the current setting time is displayed at the touch screen. The current sub section is the sub section where the current dragging point of the touch event is located at. That means, before the hand of the user leaves the touch screen 410, the time prompt module 445 determines the candidate time corresponding to the current sub section is used as the current setting time, and the current setting time is shown at the touch screen 410.

Figure 6C:
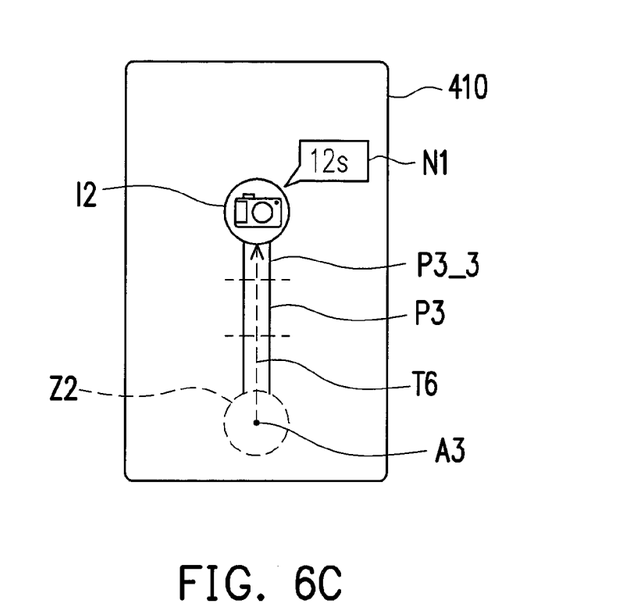
FIG. 6C is a schematic diagram showing a current setting time in an embodiment.

In the embodiment, FIG. 6C is a schematic diagram showing the current setting time in an embodiment. Please refer to FIG. 6C, the start point A3 of the touch event T6 is located at the shooting trigger area Z2, and the shutter icon I2 in the shooting trigger area moves along the predetermined path P3 while the dragging of the touch event T6. As shown in FIG. 6C, when the current dragging point of the touch event T6 is dragged to the sub section P3_3, the shutter icon I2 moves to the sub section P3_3 along with the dragging of the touch event T6. At the same time, the recognized candidate time corresponding to the sub section P3_3 is regarded as the current setting time, and a prompt window N1 is displayed at the touch screen 410 to show the current selected candidate time.

In the step S540, the shooting module 446 determines whether the end point is in the shooting trigger area. When yes, in the step S550, when no touch event is detected on the touch screen 410, the shooting module 446 directly triggers the image capturing unit to capture an image. That means, when the end point of the touch event is in the shooting trigger area, the portable electronic device 40 does not execute the timed shooting function, and after the hand of the user leaves the touch screen, the portable electronic device 40 directly execute the shooting.

Then, in the step S560, the shooting time determining module 442 recognizes the candidate time corresponding to the sub section where the end point locates, and the candidate time is regarded as the shooting countdown time. In the embodiment, the shooting time determining module 442 determines the final shooting countdown time by determining the sub section where the end point locates. In the embodiment shown in FIG. 6B, when the end point of the touch event is located at the sub section P3_3, the shooting time determining module 442 recognizes the candidate time corresponding to the sub section P3_3 to be used as the shooting countdown time of the timed shooting function. Similarly, when the end point of the touch event is located at the sub section P3_2, the shooting time determining module 442 recognizes the candidate time corresponding to the sub section P3_2 to be used as the shooting countdown time of the timed shooting function.

After the shooting countdown time is determined, in the step S570, when the countdown and shooting module 443 detects no touch event is detected on the touch screen 410, the countdown and shooting module 443 starts to count the shooting countdown time and triggers the image capturing unit to shoot an image when the shooting countdown time is up. In the embodiment, the step S570 is divided to three sub steps S571 to S573. First, in the step S571, when the countdown and shooting module 443 detects the touch event leaves the touch screen, the countdown and shooting module 443 starts to count the shooting countdown time. In the step S572, during counting the shooting countdown time, the countdown and shooting module 443 controls the shutter icon to move from the end point to the shooting trigger area and provide a countdown prompt. In an embodiment, the countdown prompt is a current countdown state displayed via the touch screen 410 or an alarm played via a loudspeaker, which is not limited herein. In the step S573, when the shutter icon moves from the end point to the shooting trigger area, the countdown and shooting module 443 finishes the shooting countdown time and triggers the image capturing unit to shoot an image.

Figure 6D:
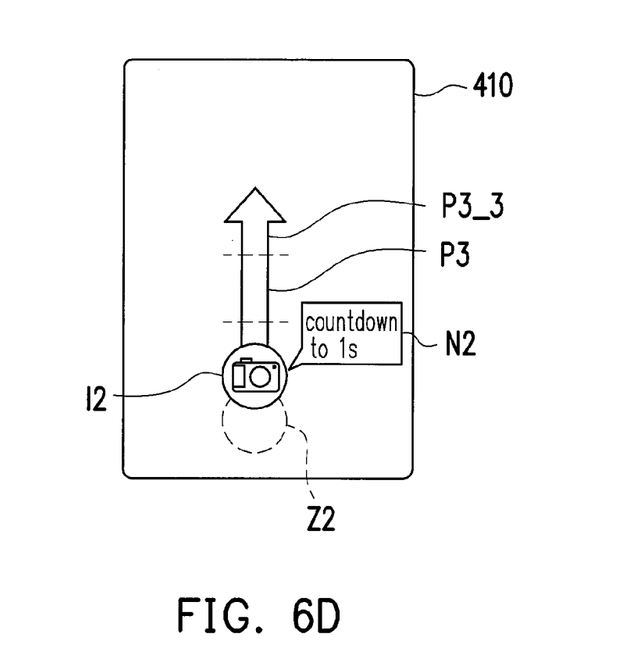
FIG. 6D is a schematic diagram showing a countdown prompt in an embodiment.

In the embodiment in FIG. 6C, when the end point of the touch event is located at the sub section P3_3, the shutter icon I2 is moved to the sub section P3_3. FIG. 6D is a schematic diagram showing the countdown prompt in an embodiment. When no touch event is detected on the touch screen 410, the countdown and shooting module 443 controls the shutter icon I2 to move from the end point to the shooting trigger area Z2, and a prompt window N2 is shown to display the remaining time of the countdown. When the shutter icon I2 moves back to the shooting trigger area Z2, the countdown and shooting module 443 finishes the shooting countdown time, and the countdown and shooting module 443 triggers the image capturing unit 420 to shoot an image. Consequently, the current countdown state can be known, which improves the convenience of using the timed shooting of the portable electronic device 40.

Figure 7:
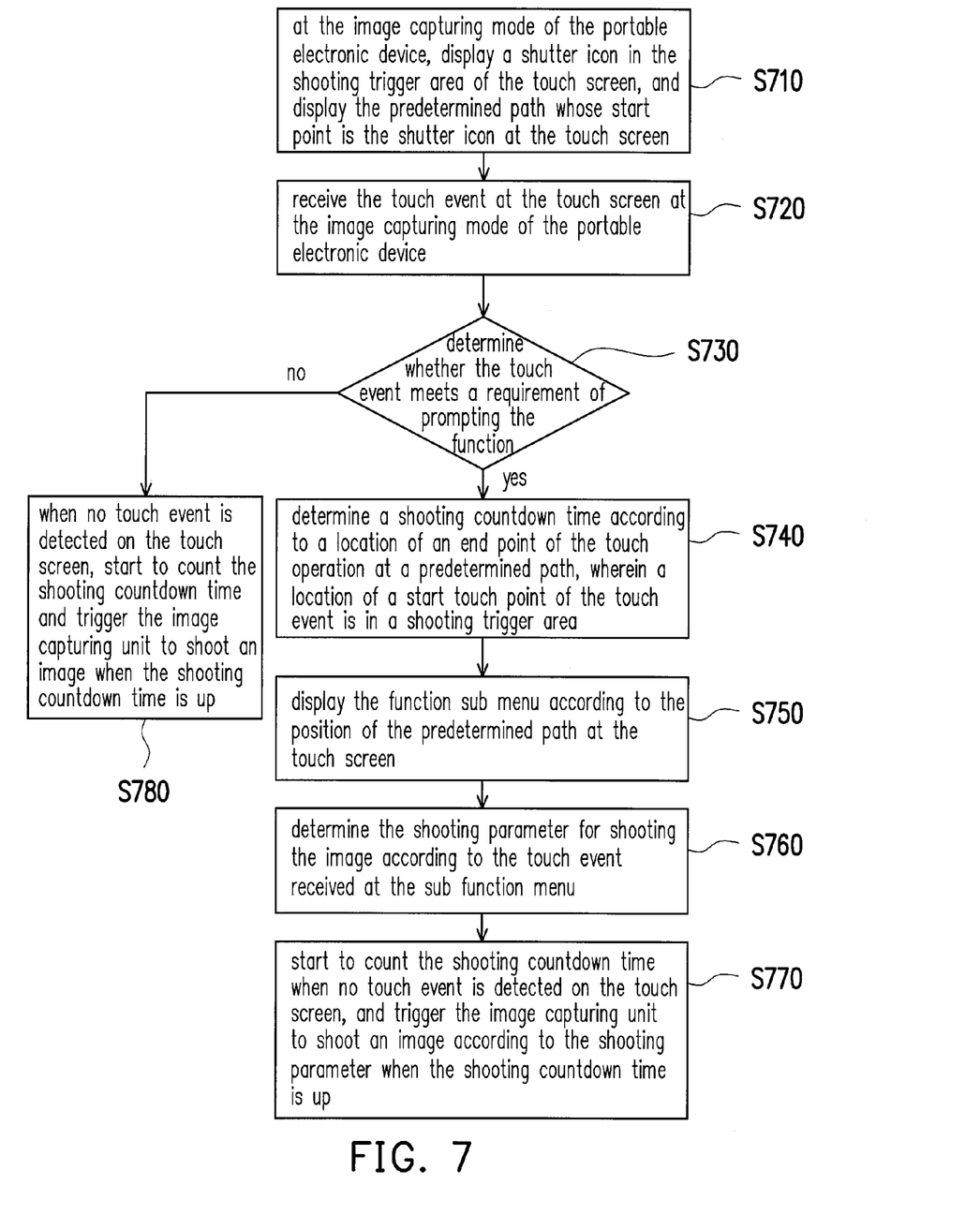
FIG. 7 is a flow chart showing a touch operation method in an embodiment.

In an embodiment, after the shooting countdown time is determined according to the dragging of the shutter icon, a sub function menu is provided, and the user can continue drag the shutter icon to determine a shooting parameter. FIG. 7 is a flow chart showing a touch event method in an embodiment. Please refer to FIG. 7, the method in the embodiment is adapted to the portable electronic device 40 shown in FIG. 4. The touch event method is illustrated with the components of the portable electronic device 40 hereinafter.

First, in the step S710, at the image capturing mode of the portable electronic device 40, the shutter icon is displayed in the shooting trigger area of the touch screen 410, and the predetermined path whose start point is the shutter icon is displayed at the touch screen 410. In the step S720, at the image capturing mode of the portable electronic device 40, the touch event receiving module 441 receives the touch event on the touch screen 410.

In the step S730, the sub menu module 447 determines whether the touch event meets a requirement for prompting the sub function menu. In the embodiment, the sub menu module 447 determines whether to prompt the sub function menu by whether the touch event stays at a predetermined location of the predetermined path over a long press time, and the sub menu module 447 shows the sub function menu near the predetermined location where the touch event stays at on the touch screen 410. The time length of the long press time is not limited herein. In detail, when the sub menu module 447 detects the touch event stays at the predetermined location of the predetermined path over 3 s, the sub menu module 447 prompts the sub function menu at the touch screen 410. When no determining result as in the step S730, as showed in the step S780, that is, when the countdown and shooting module 443 detects no touch event on the touch screen 410, the countdown and shooting module 443 starts to count the shooting countdown time and triggers the image capturing unit 120 to shoot an image when the countdown time is up.

When the touch event meets the requirement for prompting the sub function menu, the determining result in the step S730 is yes. Then, in the step S740, the shooting time determining module 442 recognizes the current dragging point to be used as the end point for determining the shooting countdown time, and the shooting time determining module 442 determines the shooting countdown time according to the location of the end point of the touch event at the predetermined path. The steps of determining the shooting countdown time according to the location of the end point is illustrated in the previous embodiment, which is omitted herein.

In the step S750, the sub menu module 447 shows the sub function menu at the touch screen according to the position of the predetermined path. In an embodiment, the shooting parameter of the sub function menu for selecting are displayed at both sides of the predetermined path or above the end point, and the user continues dragging the shutter icon to set the shooting parameter. The display way and the contents of the sub function menu are not limited, and the shooting parameters of the sub function menu are provided according to requirements. In the step S760, the sub menu module 447 determines the shooting parameter for shooting the image according to the touch event received at the sub function menu.

Figure 8:
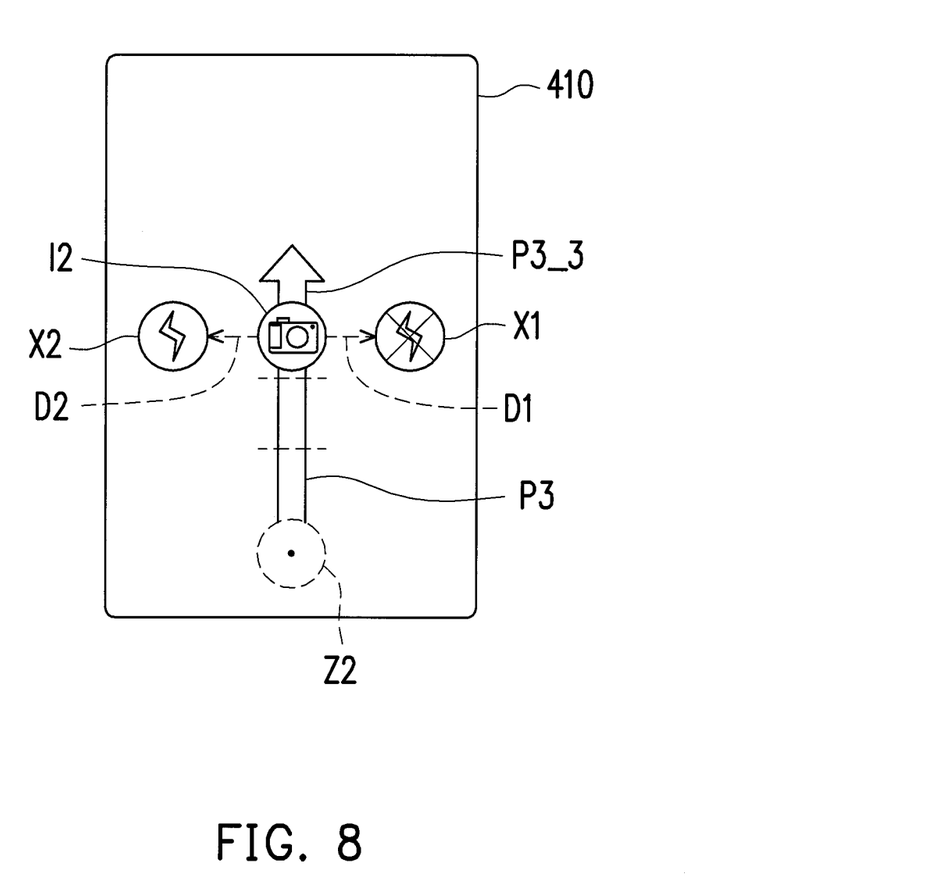
FIG. 8 is a schematic diagram showing sub function menus in an embodiment.

In the embodiment, FIG. 8 is a schematic diagram showing the sub function menus in an embodiment. Please refer to FIG. 8 and FIG. 6B, in the embodiment, when the touch event drags the shutter icon I2 to the sub section P3_3 and stays over 3 s, it meets the requirement for prompting the sub function menu. The shooting time determining module 442 takes the current touch point as the end point, and the shooting countdown time is determined according to the end point. In the embodiment, the stay time of the touch event is used to determine whether to prompt the sub function menu, which is not limited. In an embodiment, the moving track, the moving speed or the location of the touch event are taken as the requirements of prompting the sub function menu. At the same time, the sub menu module 447 shows the sub function menu at the touch screen 410 according to the position of the predetermined path P3. In the embodiment, the sub function menu includes a shooting parameter selection X1 and a shooting parameter selection X2. The shooting parameter selection X1 is displayed at one side of the shutter icon I2, and the shooting parameter selection X2 is displayed at the other side of the shutter icon I2. When the touch event moves from the end point to the location of the shooting parameter selection X1 along a first direction D1, the sub menu module 447 selects the shooting parameter corresponding to the shooting parameter selection X1. When the touch event moves from the end point to the location of the shooting parameter selection X2 along a second direction D2, the sub menu module 447 selects the shooting parameter corresponding to the shooting parameter selection X2. The shooting parameter in an embodiment is a flash light setting or a shooting mode, which is not limited herein.

Please refer to FIG. 7, in the step S770, when the countdown and shooting module 443 detects no touch event is detected on the touch screen 410, the countdown and shooting module 443 starts to count the shooting countdown time, and the image capturing unit 120 is triggered to shoot an image according to the shooting parameter determined by the sub menu module 447 when the shooting countdown time is up. The shooting parameter in an embodiment is a white balance parameter, a resolution parameter, a shooting mode or a flash light setting, which is not limited herein.

In sum, according to a portable electronic device and a touch event method in embodiments, the timed shooting function can be enabled and the shooting countdown time can be determined at the same time by simply touching and dragging on the touch screen of the portable electronic device. Thus, it is more convenient and timesaving for the user to enable the timed shooting function. Since the user does not need to press the virtual shutter button while holding the portable electronic device to trigger the shooting function, a self-portrait can be easily taken. In an embodiment, when the timed shooting function is enabled and the shooting countdown time is determined by dragging the virtual shutter button, the user can further determine a shooting parameter for shooting an image by further dragging the virtual shutter button to the sub function menu. Thus, the shot image is better, and the shooting is much convenient.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A touch operation method, applied to a portable electronic device having a touch screen and an image capturing unit, the touch operation method comprising following steps:
   detecting a touch event on the touch screen when the portable electronic device is at an image capturing mode, wherein the touch event is a drag touch event;
   determining a shooting countdown time according to a location of an end point of the touch event at a predetermined path, wherein the location of a start point of the touch event is in a shooting trigger area, and the shooting trigger area is located at one end of the predetermined path;
   determining whether to directly trigger the image capturing unit or to trigger the image capturing unit after shooting countdown time according to whether the end point of the drag touch event is located at the shooting trigger area or not;
   when the end point is located at the shooting trigger area, triggering the image capturing unit to capture the image; and
   when the end point is not located at the shooting trigger area, starting to count the shooting countdown time when no touch event is detected on the touch screen, and triggering the image capturing unit to shoot an image when the shooting countdown time is up.

2. The touch operation method according to claim 1, wherein the predetermined path is divided to at least one sub section, and different sub sections correspond to different candidate time with different time lengths, respectively.

3. The touch operation method according to claim 2, wherein the step of determining the shooting countdown time according to the location of the end point at the predetermined path is further comprised of the step of:
   recognizing the candidate time corresponding to the sub section of the predetermined path as the shooting countdown time, wherein the end point is located at one of the sub sections.

4. The touch operation method according to claim 3, wherein the touch operation method is further comprised of the step of:
   determining a current setting time from the candidate time according to where a current dragging point of the touch event is located at the sub section of the predetermined path when the touch screen continuously receives the touch event, and prompting the current setting time at the touch screen.

5. The touch operation method according to claim 3, wherein the candidate time increases along with the distance between the corresponding sub section and the shooting trigger area.

6. The touch operation method according to claim 1, wherein the touch operation method is further comprised of the step of:
   displaying a shutter icon at the shooting trigger area of the touch screen, and displaying the predetermined path whose start point is the shutter icon at the touch screen when the portable electronic device is at the image capturing mode.

7. The touch operation method according to claim 6, wherein the step of triggering the image capturing unit to shoot an image when the shooting countdown time is up further comprised of the steps of:

controlling the shutter icon to move from the end point to the shooting trigger area, and providing a countdown prompt during counting the shooting countdown time; and finishing the shooting countdown time and triggering the image capturing unit to shoot the image when the shutter icon moves from the end point to the shooting trigger area.

8. The touch operation method according to claim 1, wherein the touch operation method is comprised of the steps of:

displaying a sub function menu at the touch screen according to a position of the predetermined path when the touch event meets a requirement for prompting the sub function menu; and determining a shooting parameter to shoot the image according to the touch event that received at the sub function menu.

9. A portable electronic device, comprising:

an image capturing unit shooting an image;

a touch screen detecting a touch event;

a storage unit including a plurality of modules; and a processing unit connected to the image capturing unit, the touch screen and the storage unit to access and execute the plurality of modules stored in the storage unit, wherein the plurality of modules include:

a touch event receiving module receiving the touch event on the touch screen at an image capturing mode, wherein the touch event is a drag event;

a shooting time determining module determining a shooting countdown time according to a location of an end point of the touch event at a predetermined path, wherein the location of a start point of the touch event is located at a shooting trigger area, wherein the shooting trigger area is located at one end of the predetermined path;

a shooting module determining whether to directly trigger the image capturing unit or to trigger the image capturing unit after shooting countdown time according to whether the end point is located at the shooting trigger area or not, wherein when the end point is located at the shooting trigger area, and when no touch event is detected on the touch screen, the shooting module directly triggers the image capturing unit to shoot the image; and a countdown and shooting module starting to count the shooting countdown time when no touch event is detected on the touch screen and triggering the image capturing unit to shoot the image when the shooting countdown time is up.

10. The portable electronic device according to claim 9, wherein the predetermined path is divided to at least one sub section, and different sub sections correspond to different candidate time with different time lengths, respectively, the candidate time corresponding to the sub section of the predetermined path is used as the shooting countdown time, and the end point is located at one of the sub sections.

11. The portable electronic device according to claim 10, wherein the plurality of modules further include:

a time prompt module determining a current setting time from the candidate time according to where a current dragging point of the touch event is located at the sub section of the predetermined path when the touch screen continuously receives the touch event, and prompting the current setting time at the touch screen.

12. The portable electronic device according to claim 10, wherein the candidate time increases along with the distance between the corresponding sub section and the shooting trigger area.

13. The portable electronic device according to claim 9, wherein the plurality of modules further include:

an operation prompt module displaying a shutter icon at the shooting trigger area of the touch screen, and displaying the predetermined path whose start point is the shutter icon at the touch screen at the image capturing mode.

14. The portable electronic device according to claim 13, wherein when no touch event is detected on the touch screen, the countdown and shooting module starts to count the shooting countdown time, the countdown and shooting module controls the shutter icon to move from the end point to the shooting trigger area, and provides a countdown prompt during the counting of the shooting countdown time, and when the shutter icon moves from the end point to the shooting trigger area, the shooting countdown time of the countdown and shooting module is up and the countdown and shooting module triggers the image capturing unit to shoot the image.

15. The portable electronic device according to claim 9, wherein the plurality of modules further include:

a sub menu module showing a sub function menu at the touch screen according to a position of the predetermined path when the touch event meets a requirement for prompting the sub function menu, and determining a shooting parameter to shoot the image according to the touch event received at the sub function menu.

* * * * *